United States Patent Office 3,245,948
Patented Apr. 12, 1966

3,245,948
VINYL HALIDE POLYMERS STABILIZED WITH BASIC LEAD SALTS OF BENZENE POLYCARBOXYLIC ACIDS
John G. Hendricks, Weston, Mass., and Leonard M. Kebrich, Ridgewood, N.Y., assignors to National Lead Company, New York, N.Y., a corporation of New Jersey
No Drawing. Filed Mar. 2, 1961, Ser. No. 92,766
8 Claims. (Cl. 260—45.75)

This invention relates to vinyl resin compositions and more particularly to such compositions stabilized with respect to their resistance to the action of heat.

It is well-known that vinyl resin compositions are sensitive to the action of heat and that the acid degradation products produced by such action react to effect deterioration of the resin composition. This deterioration, primarily evidenced by color changes in the resin composition, which are in themselves undesirable, also seriously affects the electrical characteristics of the resin and ultimately flexibility and tensile strength. Since the resin compositions are necessarily exposed to heat during compounding and processing it is desirable to incorporate agents which tend to stabilize the physical properties of the resin composition.

Basic lead salts of various kinds have heretofore been employed as stabilizing agents for vinyl resin compositions. Among such basic lead salts may be mentioned, for example, dibasic lead phthalate, dibasic lead phosphite, basic carbonate white lead, basic silicate white lead and tribasic lead sulfate, among others. While such basic lead salts have been quite successful as stabilizing agents, and have gained wide popularity in the trade for this purpose, they nevertheless do not, nor does any stabilizer, confer complete immunity to heat, and there exists a continuing demand for still better stabilizers.

The widespread use of vinyl resins for electrical insulation purposes has given rise to still another requirement for stabilizers intended for use in this type of application. Such a stabilizer should not, of itself, impair the electrical resistivity of the resin composition. Moreover, it should be of such a nature that it overcomes the effects on resistivity of electrolytes (e.g., HCl) generated in the course of degradation of the resin, and does not react, in the process, to produce compounds which have untoward effects on resistivity. From this point of view, many of the known stabilizers are not entirely satisfactory, because, although they react with HCl and thus retard the degradation process, they react to produce metallic compounds, which are also disadvantageous, from the electrical viewpoint.

An object of this invention, therefore, is to provide novel and improved stabilizing agents for vinyl resins.

Another object of this invention, is to provide improved vinyl halide resin compositions stabilized against the effects of heat. Another object is to provide such compositions, which also possess high electrical resistivity. Still another object is to provide stabilized vinyl halide resin compositions of high electrical resistivity, in which the stabilizer does not react with resin degradation products to produce compounds injurious to electrical resistivity. Other objects and advantages will become apparent from the following more complete description and claims.

Broadly, this invention contemplates, as a new chemical compound, a basic lead salt of an aromatic polycarboxylic acid, said aromatic polycarboxylic acid having from 3 to 6 carboxyl groups present on the aromatic ring.

In a particularly desirable embodiment, this invention contemplates, as a new chemical compound, a basic lead salt of a benzenepolycarboxylic acid, said benzenepolycarboxylic acid having from 3 to 6 carboxyl groups present on the benzene ring.

This invention also contemplates a vinyl halide resin composition comprising, as stabilizer therefore, a basic lead salt of an aromatic polycarboxylic acid said aromatic polycarboxylic acid having from 3 to 6 carboxylic groups present on the aromatic ring.

This invention also contemplates a vinyl halide resin composition comprising, as stabilizer therefore, a basic lead salt of an aromatic polycarboxylic acid, said aromatic polycarboxylic acid having from 3 to 6 carboxyl groups present on the aromatic ring, and another stabilizer.

According to this invention, it has been discovered that aromatic polycarboxylic acids, having from 3 to 6 carboxyl groups substituted on the benzene ring, form a series of basic lead salts. As aromatic polycarboxylic acids capable of forming basic lead salts we mention trimellitic, trimesic, hemimellitic, pyromellitic, mellophanic, prehnitic, benzene pentacarboxylic and mellitic acids. The basic lead salt formed may be monobasic, dibasic, tribasic, tetrabasic or pentabasic and the salts may or may not have combined water. In either event good results can be realized. Methods for the preparation of the various aromatic polycarboxylic acids are known and constitute no part of the invention.

It has further been found that the incorporation of these basic lead aromatic polycarboxylates in a vinyl resin provides a good degree of heat stabilization, with substantially no impairment of the inherent initial electrical resistivity of the resin itself. Moreover after degradation has begun, the stabilizing action of these salts is exerted in such a way that the resistivity of the composition is maintained at a high level.

Although the basic lead aromatic polycarboxylates, when used alone, contribute a degree of heat stabilization that is satisfactory for most purposes, it may sometimes be desirable, for increased heat stability, to use other stabilizers in conjunction therewith. For this purpose, we may use conventional electrical grade stabilizers, such as the basic lead salts, or alternatively, we have found that other electrical grade stabilizers are equally effective for example, barium salts and soaps. A combination of any of the above mentioned stabilizers along with the basic lead aromatic polycarboxylate results in a stabilizer having exceptional heat and electrical stabilization properties. Surprisingly, it has even been found that the basic lead aromatic polycarboxylates increase the electrical resistivity of the vinyl composition when used in small additions or partial replacement for conventional stabilizers, depending to some extent on the nature of the conventional stabilizer and the relative amounts employed.

The basic lead aromatic polycarboxylate and other stabilizer components, if used, may be added to the resin batch separately or together and may be introduced at any desired stage of manufacture, but it is preferable to add them before or during the milling or the initial mixing of the ingredients of the resin batch. It has been found that both the basic lead aromatic polycarboxylates and the other salts disperse readily in the mixture of vinyl resin and other compounding agents so that a uniform dispersion is easily obtained. After mixing, the ingredients are fluxed and homogenized on a mill at conventional temperatures.

The basic lead aromatic polycarboxylate and the other metal salts, if used, should preferably be present in total amount between 0.05% and 20% by weight, based on the polymer. Amounts lower than 0.05% may be used with beneficial effect, but do not in general exert sufficient stabilizing action to provide a commercially-acceptable product, unless other stabilizers are used in conjunction therewith. Within the stated range, optimum results are usually obtained using amounts of a basic lead aromatic polycarboxylate, or if other salts are used therewith, amounts of a basic lead aromatic polycarboxylate and other salts which total between .5% and 7%, based on the weight of the polymer.

The ratio of basic lead aromatic polycarboxylate to metal salt may vary greatly, but preferably for every 1 part of basic lead aromatic polycarboxylate there should be present from .01 to 10 parts of a metal salt.

By the term "vinyl halide resin" or "polymer" we mean to include the various vinyl resin compounds and combinations known to the art, including vinyl halides such as polyvinyl chloride; vinyl resins produced by copolymerizing a vinyl halide with vinyl acetate or other vinyl esters; vinyl resins produced by copolymerization with an acrylic compound such as ethyl or methyl methacrylate; vinylidene halides; and vinyl-vinylidene halide copolymers.

The basic lead aromatic polycarboxylates, as exemplified by the basic lead trimellitates, have been characterized by phase rule studies based on pH and conductivity measurements as being capable of forming salts of varying degree of basicity. For example, litharge was added to an aqueous solution, placed in a ball mill, and the pH of the slurry was determined. Trimellitic anhydride was added in small increments until abrupt changes in pH were observed. The data revealed that these abrupt changes in pH occurred when the amounts of litharge and trimellitic anhydride were in stoichiometric proportions so as to correspond to monobasic and tetrabasic lead salts.

Utilizing this information, the invention may readily be prepared by adding water, acetic acid, and stoichiometric amounts of litharge, and trimellitic anhydride to a ball mill. The mill is sealed and rotated, with pH values determined at appropriate intervals. The completion of the formation of the basic lead salt is indicated by a constant pH value. For the following basic lead salts, the critical pH values of the reactions are: monobasic lead trimellitate, pH 5.4; tetrabasic lead trimellitate, pH 9.6. By employing the appropriate amounts of lead oxide and trimellitic anhydride, mixtures of the salts noted may be prepared. Other aromatic polycarboxylic acids mentioned above may be substituted and critical pH values may similarly be determined for the corresponding basic lead salts. In addition, mixtures of acids may be used resulting in mixed basic lead salts.

It is generally preferable, although not necessary, to add a small amount of a so-called solution catlyst, such as acetic acid, nitric acid, or some other acid catalyst, for the purpose of accelerating the formation of the basic lead salts. The amount of the catalytic agent employed may vary, the usual amount being from 0.10 to 0.15 pound per 100 pounds of litharge.

In order to illustrate more fully the nature of this invention and the manner of practicing the same, the following examples are presented.

Example I

Monobasic lead trimellitate was prepared by placing 150 ml. of water, 4 ml. of 1% acetic acid, 35.61 gms. of litharge and 15.52 gms. of trimellitic anhydride, in that order, in a pebble mill. The mill was sealed and rotated at temperatures to 50° C., with pH values measured at appropriate intervals. After two milling operations of 24 hours at 25° C. and 20 hours at 50° C., the pH value was 5.4. After a third milling operation of 24 hours at 25° C., the pH remained constant at 5.4.

The solid phase was then isolated by filtration and dried at a temperature of from 70° C. to 95° C. The white product was composed of rounded crystals and analysis showed it to be 66.38% lead oxide, 27.57% trimellitic anhydride, and 6.05% water; its specific gravity was 3.71, and it had a mean refractive index of 1.84.

Example II

Tetrabasic lead trimellitate was prepared by placing 300 ml. of water, 8 ml. of 1% acetic acid, 81.46 gms. of litharge and 20.25 gms. of trimellitic anhydride in a pebble mill, in the order named, sealing and rotating at a temperature of 50° C. The pH was measured after three milling operations of 24, 18, and 20 hours with corresponding pH determinations of 9.2, 9.5 and 9.6. With the latter two successive pH values almost identical, the solid phase was then isolated by filtration and dried at a temperature of from 70° C. to 95° C.

The white, rounded crystalline product was composed of 76.83% lead oxide, 17.95% trimellitic anhydride and 5.22% water; its specific gravity was 4.25 and its refractive index 2.01.

Mixtures of basic lead salts of trimellitic acid described above may be prepared in a similar manner by reacting the appropriate mole ratio of litharge to trimellitic anhydride. The "di" and "tri" salts are actually mixtures of the mono and tetra salts when microscopically examined.

Example III 100 parts of polyvinyl chloride resin were mixed with 50 parts of dioctyl phthalate plasticizer and 3 parts of monobasic lead trimellitate were added to the composition. Mixing and fluxing were accomplished in a four-minute cycle on a two-roll mill of the conventional type heated to a temperature of 300° F. The plastic composition was removed from the mill in the form of a sheet of 0.020 inch thickness.

For purposes of comparison, a second batch was prepared and processed in the identical manner, except that 3 parts of dibasic lead phthalate, a well-known stabilizer widely used in electrical compositions, were substituted for the 3 parts of monobasic lead trimellitate.

Electrical volume resistivity measurements were made at 70° C. on specimens of both sheets after conditioning in an oven at 70° C. for 30 minutes. The volume resistivity of the experimental sample, using monobasic lead trimellitate, was $13 \times 10^{12}$ ohm-cm., whereas that of the control sample, made with dibasic lead phthalate, was only $2.2 \times 10^{12}$ ohm-cm. The trimellitate thus provides a more than 5-fold improvement over dibasic lead phthalate, a commercial stabilizer having excellent electrical properties.

Example IV

The procedure described in Example III was repeated, except that four samples, designated A, B, C, and D, were prepared, with varying formulations containing monobasic lead trimellitate alone and in conjunction with other stabilizers, and a control (sample A), containing no basic lead trimellitate. The four batches were milled as described in Example III, and portions of the plastic composition were withdrawn from the mill in the form of sheets of 0.020 and 0.040 inch thickness. The heat stability of each batch was determined by visual observation of the color of a 0.040 inch specimen after heating in a forced-circulation type oven for 25 minutes at 400° F. The volume resistivity was determined on the 0.020 inch specimens as described in the preceding example. The formulations of the four batches and the resistivity and heat stability results obtained are given in Table I.

TABLE I

|  | A | B | C | D |
|---|---|---|---|---|
| Polyvinyl chloride resin, parts (wt.) | 100 | 100 | 100 | 100 |
| Di-2-ethylhexyl phthalate, parts (wt.) | 50 | 50 | 50 | 50 |
| Dibasic lead phthalate, parts (wt.) | 3 |  | 1 | 1 |
| Monobasic lead trimellitate, parts (wt.) |  | 3 | 2 | 2 |
| Barium stearate, parts (wt.) |  |  |  | 1 |
| Volume resistivity at 70° C., in $10^{12}$ ohm-cm | 2.2 | 13 | 9.4 | 8.9 |
| Heat stability | Good | Fair | Good | Excellent |

The data set forth in Table I indicated that monobasic lead trimellitate can be used alone to provide an outstanding improvement in volume resistivity with some sacrifice in heat stability, or in conjunction with other stabilizers to provide a composition far exceeding commercially accepted standards in both resistivity and heat stability.

*Example V*

The procedure described in the preceding examples was employed to make experimental samples (B, C and D), employing respectively dibasic, tribasic and tetrabasic lead trimellitates, for comparison against a commercially-acceptable control made with dibasic lead phthalate. All samples were processed in the manner previously described and tested for volume resistivity. The formulations and the results obtained are set forth in Table II:

TABLE II

|  | A | B | C | D |
|---|---|---|---|---|
| Polyvinyl chloride resin, parts (wt.) | 100 | 100 | 100 | 100 |
| Di-2-ethylhexyl phthalate, parts (wt.) | 50 | 50 | 50 | 50 |
| Dibasic lead phthalate, parts (wt.) | 3 |  |  |  |
| Dibasic lead trimellitate, parts (wt.) |  | 3 |  |  |
| Tribasic lead trimellitate, parts (wt.) |  |  | 3 |  |
| Tetrabasic lead trimellitate, parts (wt.) |  |  |  | 3 |
| Volume resistivity at 70° C., in $10^{12}$ ohm-cm | 2.8 | 11 | 13 | 13 |

The data set forth in Table II illustrate that the dibasic, tribasic and tetrabasic lead trimellitates contribute favorable effects on volume resistivity comparable to that provided by monobasic lead trimellitate, (see Table I). In addition this is a four- or five-fold improvement over present commercially-acceptable materials, namely dibasic lead phthalate.

*Example VI*

The procedures described in the foregoing examples were employed to prepare four samples illustrating the results achieved by use of basic lead trimellitate in combination with other stabilizers. The volume resistivity measurements and heat-stability tests were made in the same manner as described in the preceding examples. The formulations employed, and the results obtained, are set forth in Table III:

TABLE III

|  | A | B | C | D |
|---|---|---|---|---|
| Polyvinyl chloride resin | 100 | 100 | 100 | 100 |
| Di-2-ethylhexyl phthalate | 50 | 50 | 50 | 50 |
| Dibasic lead phthalate | 4.5 |  | 3.5 | 2.25 |
| Tetrabasic lead trimellitate |  | 4.5 | 1.0 | 2.25 |
| Barium stearate | 0.5 | 0.5 | 0.5 | 0.5 |
| Volume resistivity at 70° C. in $10^{12}$ ohm-cm | 3.6 | 15 | 7.1 | 9.9 |
| Heat-stability | Good+ | Good | Good+ | Good+ |

*Example VII*

The procedure described in Example I was employed in preparing tetrabasic lead trimesate and tribasic lead benzenetetracarboxylate. The volume resistivity measurements and heat-stability tests were made in the same manner as described in the preceding example, except that samples were exposed to a temperature of 375° F. for the heat stability test. The formulations employed, and the results obtained, are set forth in Table IV:

TABLE IV

|  | A | B | C |
|---|---|---|---|
| Polyvinyl chloride resin | 100 | 100 | 100 |
| Di-2-ethylhexyl phthalate | 50 | 50 | 50 |
| Dibasic lead phthalate | 3 |  |  |
| Tetrabasic lead trimesate |  | 3 |  |
| Tribasic lead benzene tetracarboxylate |  |  | 3 |
| Volume resistivity at 70° C. in $10^{12}$ ohm-cm | 3.8 | 5.1 | 5.1 |
| Heat stability | Good | Good+ | Good |

*Example VIII*

The procedure described in Example I was employed in preparing tribasic lead hemimellitate and tetrabasic lead trimesate. The volume resistivity measurements and heat stability tests were made in the same manner as described in the preceding examples, except that samples were exposed to a temperature of 375° F. for the heat stability test. The formulations employed and the results obtained, are set forth in Table V:

TABLE V

|  | A | B | C |
|---|---|---|---|
| Polyvinyl chloride resin | 100 | 100 | 100 |
| Di-2-ethylhexyl phthalate | 50 | 50 | 50 |
| Dibasic lead phthalate | 3 |  |  |
| Tribasic lead hemimellitate |  | 3 |  |
| Tribasic lead trimesate |  |  | 3 |
| Volume resistivity at 70° C. in $10^{12}$ ohm-cm | 3.8 | 5.1 | 5.5 |
| Heat stability | Good | Good | V. Good |

*Example IX*

The procedure described in Example I may be employed in preparing the basic lead salts of benzene pentacarboxylic acid and of mellitic acid. The volume resistivity and heat stability tests can be performed in the same manner as described in the previous examples. The above mentioned basic lead salts will show a good degree of stabilization, namely heat stability and volume resistivity.

*Example X*

Substituted polycarboxylic acids may be employed in preparing the basic lead salts of this invention. As a substituted polycarboxylic acid that can be utilized to form the basic lead polycarboxylate we mention 5-hydroxybenzene-1,2,4-tricarboxylic acid. This acid may be synthesized by a procedure essentially that of French Patent 816,718 and German Patent 686,908. The preparation of the basic lead salt may be done accordingly to the method described in the above examples.

Tribasic lead 5-hydroxy trimellitate was evaluated in the same manner as Example VIII, except that 5 parts of stabilizer was utilized in the composition. The formulations employed and the results obtained, are set forth in Table VI.

TABLE VI

|  | A | B |
|---|---|---|
| Polyvinyl chloride resin | 100 | 100 |
| Di-2-ethylhexyl phthalate | 50 | 50 |
| Di-basic lead phthalate | 5 |  |
| Tribasic lead 5-hydroxytrimellitate |  | 5 |
| Volume resistivity at 70° C. in $10^{12}$ ohm-cm | 3.6 | 9.0 |
| Heat stability | Good | Good |

The foregoing examples, for purposes of comparison, all employed the same basic formulation, aside from the stabilizer, i.e. 100 parts of polyvinylchloride resin, and 50 parts of di-2-ethylhexyl phthalate. It will be understood that a variety of vinyl halide resins, plasticizers, coloring and modifying agents may be present without significantly affecting the stabilization accomplished, and that the favorable results obtained with this particular formulation are characteristic of those obtained with vinyl resin compositions in general.

While this invention has been described and illustrated by the examples shown, it is not intended to be strictly limited thereto and other modifications may be employed within the limits of the following claims.

We claim:

1. A resinous composition comprising a vinyl halide resin and a stabilizing amount of stabilizer therefor, said stabilizer being a basic lead salt of a benzene polycarboxylic acid, said benzene polycarboxylic acid having from 3 to 6 carboxyl groups present on the benzene ring.

2. A resinous composition according to claim 1, said stabilizer being a basic lead salt of a benzene tricarboxylic acid.

3. A resinous composition according to claim 1, said stabilizer being a basic lead salt of a benzene tetracarboxylic acid.

4. A resinous composition according to claim 1, said stabilizer being a basic lead salt of a benzene pentacarboxylic acid.

5. A resinous composition according to claim 1, said stabilizer being a basic lead salt of a benzene hexacarboxylic acid.

6. A resinous composition comprising a vinyl halide resin and a stabilizing amount of a stabilizer therefor, said stabilizer being a basic lead salt of a benzene polycarboxylic acid, said benzene polycarboxylic acid having from 3 to 6 carboxyl groups present inon the benzene ring; and an electrical grade stabilizer.

7. A resinous composition comprising a vinyl halide resin and a stabilizer therefor, said stabilizer being a basic lead salt of a benzene polycarboxylic acid, said benzene polycarboxylic acid having from 3 to 6 carboxyl groups present on the benzene ring; said stabilizer being present in the range of from 0.05% to 20% by weight based on the resin.

8. A resin composition comprising a vinyl halide resin and a stabilizer therefor, said stabilizer being a basic lead salt of a benzene polycarboxylic acid, said benzene polycarboxylic acid having from 3 to 6 carboxyl groups present on the benzene ring; and an electrical grade stabilizer; said stabilizers being present in the range of from 0.05% to 20% by weight based on the resin.

References Cited by the Examiner

UNITED STATES PATENTS

| | | | |
|---|---|---|---|
| 2,275,211 | 3/1942 | Urbain et al. | 260—435 X |
| 2,330,239 | 9/1943 | Prutton | 260—435 |
| 2,412,784 | 12/1946 | Stewart et al. | 260—435 |
| 2,565,171 | 8/1951 | Faith | 260—435 |
| 2,922,804 | 1/1960 | Kuckro | 260—435 |
| 2,968,642 | 1/1961 | Le Suer | 260—45.75 |
| 2,970,981 | 2/1961 | Mack | 260—45.75 |
| 2,985,617 | 5/1961 | Salyor et al. | 260—45.7 |

DONALD E. CZAJA, *Primary Examiner.*

ALFONSO D. SULLIVAN, LEON J. BERCOVITZ,
*Examiners.*